United States Patent
Rosenberger et al.

(10) Patent No.: US 6,808,244 B2
(45) Date of Patent: Oct. 26, 2004

(54) METHOD FOR OPTIMIZING AN IMAGE PROCESSING AND PRINTING PROCESS

(75) Inventors: Karolina Rosenberger, Osterfingen (CH); Matthias Reinhold, Lottstetten (DE); Fabian Bönsch, Neuhausen (CH)

(73) Assignee: Alcan Technology & Management AG, Neuhausen am Rheinfall (CH)

(*) Notice: Subject to any disclaimer, the term of this patent is extended or adjusted under 35 U.S.C. 154(b) by 9 days.

(21) Appl. No.: 10/416,606

(22) PCT Filed: Oct. 31, 2001

(86) PCT No.: PCT/EP01/12614

§ 371 (c)(1), (2), (4) Date: May 13, 2003

(87) PCT Pub. No.: WO02/39725

PCT Pub. Date: May 16, 2002

(65) Prior Publication Data

US 2004/0027416 A1 Feb. 12, 2004

(30) Foreign Application Priority Data

Nov. 13, 2000 (EP) ............................ 00811070

(51) Int. Cl.⁷ ........................ B41J 2/205; H04N 1/403; G06T 5/00
(52) U.S. Cl. ............... 347/15; 358/516; 382/254
(58) Field of Search ................. 347/15; 358/516, 358/517, 515, 3.01, 1.9; 382/254

(56) References Cited

U.S. PATENT DOCUMENTS 6,081,625 A * 6/2000 Sakaue ............... 382/254

* cited by examiner

Primary Examiner—Lamson D Nguyen
(74) Attorney, Agent, or Firm—Bachman & LaPointe, P.C.

(57) ABSTRACT

A method for optimizing colored images emitted by a color printer on the non-white surfaces of substrates and for optimizing the amounts of printing ink used, wherein an image motif is processed by a computer-assisted image processing system in order to form a master copy which is ready for output. The method determines, for each pixel, whether and with what color density, a white underprint can be applied to a corresponding pixel, using an algorithm based on overall color density $S_F$. The surface of the substrate is thus only underprinted with white on the pixels of the master copy where the overall color density is lacking or low.

10 Claims, 1 Drawing Sheet

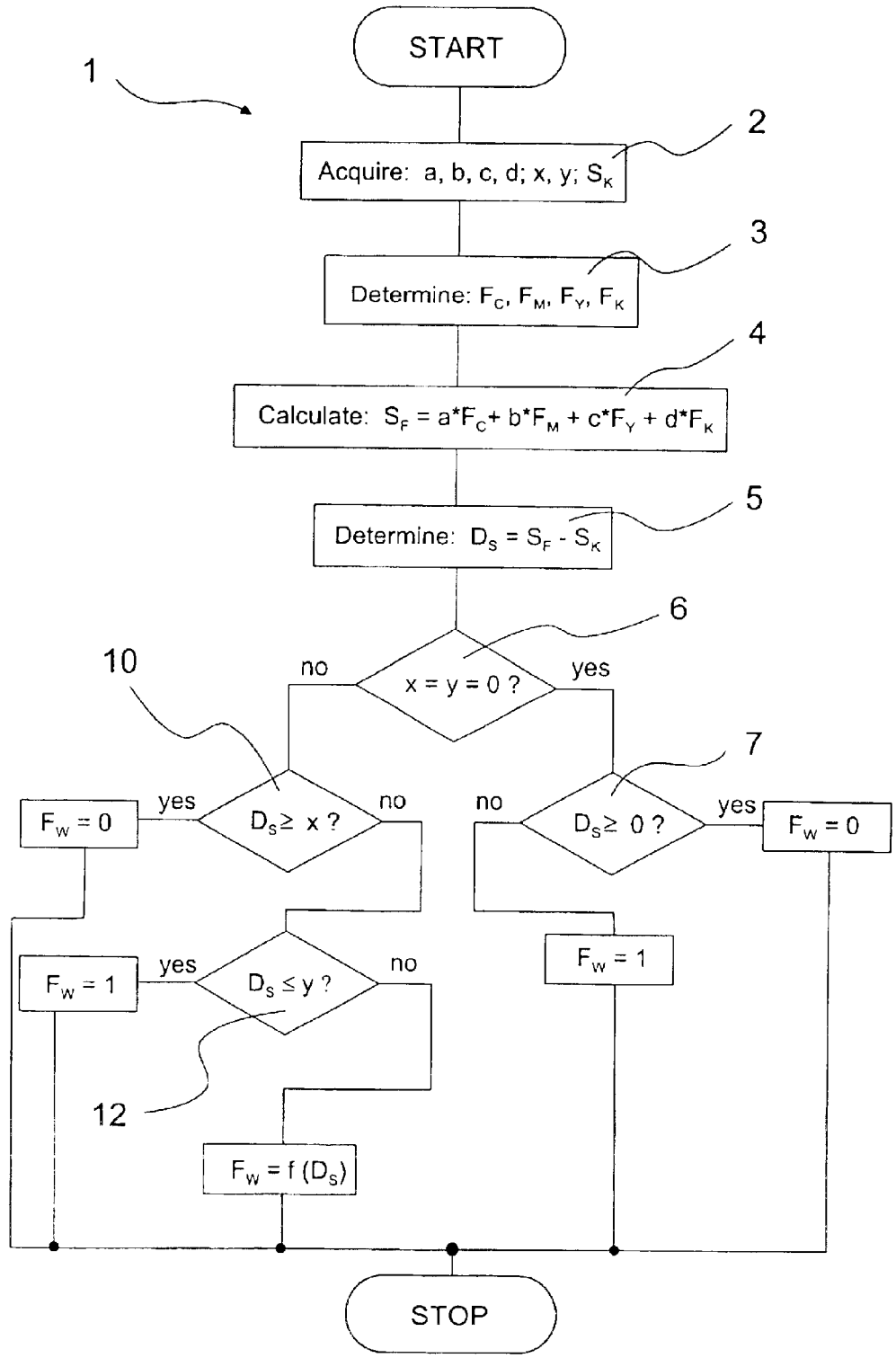

METHOD FOR OPTIMIZING AN IMAGE PROCESSING AND PRINTING PROCESS

BACKGROUND OF THE INVENTION

The present invention relates to a method for optimising print images output by color printers onto substrate surfaces, in particular onto non-white substrate surfaces and for optimising the printing ink quantities used, an image motif being processed by means of a computer-aided image processing system to form an image original which is ready to output. The invention also relates to packaging films printed by the method according to the invention.

Image motifs, with which a substrate surface is to be printed, are acquired or created by means of computer-aided image processing systems and brought into image originals which are ready to output. The processing of the image data into image originals which are ready to output takes place with the aid of appropriate image processing software, such as for example PageMaker®, Quark Xpress®, Barco Packedge® or Macromedia Freehand® on DTP systems, wherein "DTP" stands for "Desktop Publishing". DTP is a current designation for creating print publications by means of computers. The image data are displayed on a screen according to the principle of additive color mixing, for example in the known RGB format (R=red, G=green, B=blue).

The image original ready to output is then passed to an image output system, converted into a format which can be read by an image output system and printed by a color printer, wherein when printing a non-white substrate surface, a white underprint is executed before the actual print of the image motif. If the printing is a counter-print, white is applied as the last color, in other words after printing the actual image motif, as an overprint on the print image.

As the mode of operation of color printers, such as for example color printing systems operating by the electrophotographic method, is based on the principle of subtractive color mixing, the image data are converted into a subtractive color format prior to transfer to the image output system. The known CMY color space is generally used for this purpose, comprising the three primary color planes cyan (C), magenta (M) and yellow (Y). Cyan corresponds approximately to a blue-green and magenta approximately to a purple. The printing systems here use a cyan, magenta and yellow printing ink, from which further colors can be produced, wherein the primary printing colors act as color filters. Light which falls through a C, M or Y primary printing color, is absorbed or filtered in certain spectral ranges by the printing ink, so only light in a limited spectral range is reflected by the printing ink, and perceived by the human eye as the color of the toner. Theoretically, black can be produced by the ideal mixing of the primary printing colors C, M, and Y, as now all the light is absorbed or filtered. However, in practice a particularly deep and strong black cannot be produced by mixing the primary printing color, so apart from the CMY primary printing color a black (K) printing ink completely absorbing the light is used for black portions and grey levels. The color space supplemented by black is designated the CMYK color space.

In digital image processing systems, the image original is divided into individual image points, also called pixels. A respective value for each of the four primary printing colors is allocated to each image point, for example by using the CMYK printing space. This value represents the so-called color density. For each image point various mixed colors can be shown with the four color planes and the color density values allocated to them.

The color density, also called color covering, is a standardised variable for the applied quantity of printing ink. The color densities $F_C$ for C (cyan), $F_M$ for M (magenta), $F_Y$ for Y (yellow) and $F_K$ for K (black) are in a defined range of 0 to 1 or 0 to 100%, wherein 1 represents a maximum application of the corresponding printing ink and 0 no application of the corresponding printing ink. The sum of the individual applied color densities are called the total color density. The application of the maximum color density $F_C$, $F_M$ and $F_Y$ of the three primary colors CMY therefore produces the high total color density or total color covering of 3 or 300%.

The image data of the image original are either acquired in the form of raster or vector data. Accordingly, the image original can be present in a bitmap or vector graphics data file format. Standardised vector graphics data file formats are, for example PostScript (PS) which inter alia includes Encapsulated Postscripts (EPS) or Portable Document Format (PDF). A standardised bitmap or raster graphics format is, for example Tagged Image File Format (TIFF).

Generally the image originals which are ready to output are placed in PostScript data files, these data files, apart from the actual image data, containing further information necessary for further processing of the image data, for example with reference to formatting and instructions such as, for example, control instructions to the image output system. Postscript data files may also contain inter alia image objects present in a bitmap format. The image original can therefore be, for example, an object embedded in the PostScript data file and present in a raster graphics format, for example TIFF format.

Digital image output systems generally contain a "Raster Image Processor" (RIP) and a printing unit. The raster image processor (RIP) determines from the image original supplied, for example in a PostScript data file, the size, quantity and position of the image points (pixels) and converts these into a format which can be interpreted by a printing unit. The image data converted into printing instructions are converted in the printing unit into a color print.

The current image processing systems are designed for printing white substrate surfaces, in particular white paper. The white substrate surface is thus generally included in the coloring process in image processing. White is for example generated by the allocation of the total color density CMYK=0, in other words image points with the corresponding zero value contain no color application. Apart from showing white surfaces, white is also necessary for showing the color brightness. The color brightness can be determined, on the one hand, by varying color densities and, on the other hand, by a raster display of the image points.

To obtain the same or a comparable color impression when printing colored, translucent or transparent substrates, as is produced during printing of a white underlay, the substrate surface provided for printing is therefore underprinted with white prior to the actual application of the print image. Underprint means that the white printing is located under the actual print image directly on the substrate surface. In the case of counter-printing on a transparent or translucent substrate with a colored, translucent or transparent, in particular non-white, substrate resting on the counter-print, a white overprint is applied for the above-mentioned reasons directly on the print image.

However, in image regions with an adequately large total color density, i.e. in image regions in which the white substrate surface is not visible or does not shine through owing to a large color application, a white underprint is not necessary. The dark color tones, i.e. the places with a high total color density, are frequently faded or they even appear unsaturated owing to the white underprint, so in order to achieve deep colors the overlying total color density has to be additionally increased.

Because of the surface-covering white underprint or overprint and the print image arranged thereabove, a very high color application is also, moreover, often achieved and this can impair the melting of the toner, for example, in the electrophotographic printing method and the image quality.

Basically, the image processing can be oriented to the specific color properties of the substrate surfaces to be printed. However, this requires adaptation of the corresponding image processing systems, in particular image processing software, connected with high expenditure.

The object of the invention is therefore to provide a method for creating an image original which is ready for printing for visually colored, translucent, transparent, specular or metallic appearing substrate surfaces or substrates and for the printing thereof, wherein the drawbacks resulting because of the above-described white underprint or overprint are to be eliminated, without expensive adaptation of the image processing software being necessary.

SUMMARY OF THE INVENTION

According to the invention, the object is achieved by a method for optimizing colored images emitted by a color printer on the non-white surfaces of substrates and for optimizing the amounts of printing ink used, wherein an image motif is processed by a computer-assisted image processing system in order to form a master copy which is ready for output. The method determines, for each pixel, whether and with what color density, a white underprint can be applied to a corresponding pixel, using an algorithm based on overall color density $S_F$. The surface of the substrate is thus only underprinted with white on the pixels of the master copy where the overall color density is lacking or low.

BRIEF DESCRIPTION OF THE DRAWINGS

The invention will be described in more detail hereinafter with reference to the flow chart according to FIG. 1.

DETAILED DESCRIPTION

According to the invention, a method for optimizing print images comprises processing image points of the image original with small or missing total color covering, prior to application of the print image, a base print in white is applied directly to the substrate surface or in a counter-print, a base print in white is applied directly to the print image, wherein for each image point at least the following steps are carried out, for example, in the shown indirect or direct sequence:
a) displaying the image data of the image original which is ready to output in a raster graphics format with the primary printing colors CMYK;
b) applying a further color plane "white" (W);
c) acquiring the color density values $F_C$ for C (cyan), $F_M$ for M (magenta), $F_Y$ for Y (yellow) and $F_K$ for K (black) and determining an overall color density $S_F$ from the color density values $F_C$, $F_M$, $F_Y$, and $F_K$.
d) establishing the color density value $F_W$ for the color plane white as a function $F_W=f(S_F)$ of the total color density $S_F$, wherein the dependency $F_W=f(S_F)$ consists in the fact that with an increasing total color density $S_F$ over the interval of $0 \leq S_F \leq S_{Fmax}$ smaller color density values $F_W$ are continuously and/or discretely allocated, wherein $S_{Fmax}$ corresponds to the maximum possible total color density $S_F$,
e) creation of the modified image original in a raster graphics data format with at least 5 color planes (CMYKW);
f) allocation of the modified image data of the image original to a printer driver or "Raster Image Processor" (RIP) and conversion into a data format which can be interpreted by the printer unit, printing the print image and the white base print.

In a preferred embodiment of the invention, the color density value $F_W=0$ is allocated in the case where $S_F=S_{Fmax}$. In a further preferred embodiment of the invention the maximum color density value $F_W=1$ is allocated in the case where $S_F=0$.

In a development of the invention it is provided that at image points of the image original with small or missing total color covering, prior to application of the print image, a base print in white is applied directly to the substrate surface, or, in a counter-print, a base print in white is applied directly to the print image, wherein for each image point at least the following steps are carried out in the shown indirect or direct sequence:
a) displaying the image data of the image original which is ready to output in a raster graphics format with the primary printing colors CMYK,
b) applying a further color plane "white" (W),
c) acquiring the color density values $F_C$ for C (cyan), $F_M$ for M (magenta), $F_Y$ for Y (yellow) and $F_K$ for K (black) allocated to the individual image points,
d) allocation of weighting factors a, b, c and d with a value from 0 to 1 and forming weighted color density values: $a^*F_C$, $b^*F_M$, $c^*F_Y$ and $d^*F_K$,
e) forming a weighted total color density $S_{Fg}$ from the total of the weighted color density values: $S_{Fg}=(a^*F_C+b^*F_M+c^*F_Y+d^*F_K)$,
f) establishing a critical total color density $S_K$ and forming the differential value $D_S=S_{Fg}-S_K$ and establishing the interval limits x, y with $0 \leq x \leq (S_{Fmax}-S_K)$ and $(0-S_K) \leq y \leq 0$, wherein
  i) a color density value F of 0 is set for the color plane white in the case where $D_S \geq 0$ for x=y=0,
  ii) a color density value $F_W$ of 1 is set for the color plane white in the case where $D_S \leq 0$ for x=y=0,
  iii) a color density value $F_W$ of 0 is set for the color plane white in the case where $D_S \geq x$ for $0 \leq x \leq (S_{Fmax}-S_K)$,
  iv) a color density value $F_W$ of 1 is set for the color plane white in the case where $D_S \leq y$ for $(0-S_K) \leq y \leq 0$, and
  v) in the case where $y \leq D_S \leq x$ for $0 \leq x \leq (S_{Fmax}-S_K)$ and $(0-S_K) \leq y \leq 0$ a color density value $F_W=f(D)$ between 0 and 1 is set for the color plane white as a function $f(D_S)$ to be determined, wherein $F_W=f(D_S)$ describes a continuous increase in the color density values $F_W$ for reducing differential values $D_S$,
g) creating the modified image original in a raster graphics format with at least 5 color planes (CMYKW) and
h) allocating the modified image data of the image original to a printer driver or "Raster Image Processor" (RIP) and conversion into a data format which can be interpreted by the printer unit, printing the print image and the white base print.

If conventional printing is involved, i.e. not a counter-print, a white underprint is applied by the printer unit directly onto the substrate surface following completed allocation of the modified image data of the image original to a printer driver or "Raster Image Processor" (RIP) and after conversion of the image original into a data format which can be interpreted by the printer unit with the aid of the color density values $F_W$ for the color plane white allocated to the individual pixels. The print image is then printed on the white underprint.

If the printing is a counter-print, once allocation of the modified image data of the image original to a printer driver or "Raster Image Processor" (RIP) has been completed and after conversion of the image original into a data format which can be interpreted by the printing unit, the print image is printed on the substrate surface. A white overprint is then applied to the print image with the aid of the color density values $F_W$ for the color plane white allocated to the individual pixels.

The so-called white base print is always behind the actual print image for the observer of the image print. Therefore, the base print in conventional printing lies on the substrate surface and the print image is arranged on the base print. On the other hand, with a counter-print the print image lies directly on the substrate surface of a transparent or translucent substrate and the base print is arranged on the print image. The print image can therefore be an underprint or an overprint.

"Ready to output image original" means that the processing of the image motif into an image original designed for the printing of white substrate surfaces is complete. "Ready to print image original" means that the image original is ready for printing non-white substrate surfaces modified according to the invention and for transfer to an image output system.

Image motifs may, for example, contain drawing, letter or number sequences, illustrations, patterns, rasters, random patterns or combinations of said elements or may consist thereof. The printing image is preferably a color image.

With the inclusion of weighting factors a, b, c, d the different visual cooperation of the individual primary colors CMYK can be taken into consideration with a white substrate surface. A color. application yellow (Y) in the maximum color density of 1 may, for example, not yet cover the surface substrate in a visually opaque manner, while for example, a color application magenta (M) in the maximum color density of 1 may be able to cover the substrate surface in a visually opaque manner.

In a particular embodiment of the invention there is, for example, no weighting and the value 1 is allocated to the weighting factors: a=b=c=d=1. The variables x and y establish interval limits for the differential value $D_S = S_F - S_K$. With the creation of the condition $0 \leq x \leq (S_{Fmax} - S_K)$ and $(0 - S_K) \leq y \leq 0$ an interval in the range of y and x is formed around or at the differential value $D_S = 0$ which is produced from $S_F = S_K$. According to the invention it is provided that for differential values $D_S$ lying within the interval, the color density value $F_W$ is determined for the function $f(D_S)$, wherein the function $f(D_S)$ for increasing differential values $D_S$ describes continuously decreasing color density values $F_W$. The function $f(D_S)$ may be, for example, linear or non-linear, for example exponential. Moreover, for differential values $D_S$, which are greater than or equal to x, the color density value $F_W$ is set at 0 and for differential values $D_S$ which are smaller or equal to y, the color density value $F_W$ is set at 1. In cases iii) to v) only x or y can equal zero, in each case.

In a particular embodiment of the invention no interval around the differential value $D_S = 0$ is provided. In this case x=y=0 is set. In the case for differential value $D_S$ of greater or equal to 0 a color density value $F_W$ of 0 is set for the color plane white and in the case of a differential value $D_S$ of less than 0 a color density value $F_W$ of 1 is set for the color plane white.

The weighting factors a, b, c, d, the critical total color density $S_K$ and the interval values x and y are preferably transferred as input variables to the computer unit or the programme routine by way of appropriate input means.

Owing to the allocation according to the invention of a color density $F_W$ for each image point, no or one white base print with a low color density $F_W$ is executed, for example at image points with a high color covering, which completely covers the white base print, whereas a white base print with a high or maximum color density $F_W$ is executed at image points with low or no color covering.

It may be provided that, for example to include the visual effect of the substrate surface in the image design, a further color plane with an imaginary special color Z and a color density $F_Z$ of greater than 0 to 1 is allocated to image points with a total color density CMYK=0, i.e. image points without color covering, but in which a white base print is dispensed with or the color density $F_W$ is to be less than 1. The color density $F_Z$ of the special color Z represents that proportion of the color density $F_W$ which is to be windowed in the white level so that:

$$F_W = 1 - F_Z.$$

The creation of the color plane Z and the allocation of the corresponding color densities $F_Z$ preferably takes place during the image processing, i.e. during the creation of the ready to output image original.

In a particular embodiment of the invention, a color density $F_Z$ of either 0 or 1 is allocated for each image point with a total color density CMYK=0 in a color plane of the special color, so a white base print with a maximum color density $F_W$ is executed for $F_Z = 0$ and no white base print is implemented for $F_Z = 1$.

It can also be provided that the color plane white is partially or completely windowed by allocation of a color density $F_Z > 0$ at image points at which quite generally $F_W > 0$. The total color density CMYK in these cases is 0 or greater, but less than the maximum total color density.

The allocation according to the invention of the color density values $F_W$ and optionally $F_Z$ may also take place during the actual image processing by means of desktop publishing, i.e. during the creation of the ready to output image original. Furthermore, the method steps according to the invention may be a component of the image processing software. In a preferred embodiment, the programme steps according to the invention are carried out in a separate programme routine on the ready to output image original.

The ready to output image original may exist, for example, as a PostScript data file, the image data of the image original being transformed into a processable TIFF format to carry out the method steps according to the invention. Once processing is complete the image data are linked into the PostScript data file. The PostScript data file with the ready to print image original modified according to the invention can then be passed to the image output unit.

The image data are preferably embedded as a raster graphics object in a PostScript data file. The raster graphics format is preferably in TIFF format Version 6 or higher, i.e. in a version which allows the creation of further color planes apart from CMYK.

The printing unit of the image output system preferably operates by an electrophotographic method using so-called toner systems. This may be an indirect or direct electrophotographic method. An indirect electrophotographic method is preferably used, such as for example is known from xerography.

The toner used in electrophotographic methods may be in solid form, for example powdery, wax-like or resin-like or in liquid or pasty form. The toner may be, for example a two-component toner, such as dry toner, for example present in powder form or in liquid form. Furthermore, the toner in an expedient embodiment may also be a single component toner, made for example of resin particles, in which inter alia pigments are dispersed. Preferred are single component toners in the form of resin particles and in particular preferred are dry toners in powder form. The toner is suitably a transparent or translucent toner.

Electrophotographic methods and the toner systems used for them are described in more detail, for example, in "Ullmann's Encyclopedia of Industrial Chemistry, Sixth Edition, 1999, Electronic Release: Chapter 2.1.1. Electrophotography".

The method according to the invention is suitable for printing flexible packaging films, in particular packaging films with non-white surfaces. The packaging films may, for example be transparent, translucent, opaque and/or colored or color-penetrated. The packaging films may comprise colored, specular or metallised surface layers and have visually colored, specular and/or metallised appearing surfaces.

The packaging films may be monofilms or film composites. The packaging films may be layers or films made of plastics material, such as polyolefins, polyesters, polypropylenes, polyamides or made of metals, such as aluminium, iron, steel or alloys thereof, or made of pulps, such as paper, glassine or cellulose film. Furthermore, the packaging material may also comprise ceramic coatings.

The method according to the invention is in particular for printing flexible transparent or translucent packaging films comprising or made of plastics material and for printing flexible packaging foils made of metal, for example aluminium or flexible packaging films, for example substantially made of plastics material, with visually metallised or specular appearing surfaces.

The thickness of the packaging material may, for example be 5 $\mu$m to 1,000 $\mu$m. Thicknesses of 7 to 200 $\mu$m are suitable.

The printing process may, for example be integrated as a method step in-line in the continuous production process of packaging materials or packagings. The packaging film is preferably continuously printed in a continuous film printing plant. The colors magenta, cyan, yellow, black and white are printed in different sequence from case to case at printing stations arranged consecutively in a printing plant or printing unit.

Owing to the method steps according to the invention a surface-covering white underprint or overprint with maximum color density can be dispensed with in most cases. The white color covering can instead be allocated in a targeted manner to the individual image points. Toner is thus saved. Furthermore, the total color covering is generally less and this has a positive effect on the print quality.

FIG. 1 shows a flow chart 1 of the algorithm for determining the color density $F_W$ (color plane white) of an individual image point. At the beginning in step 2, the weighting factors a, b, c and d and the interval limits x and y and the critical total color density value $S_K$ are acquired as input variables. The weighting factors are in a range of 0 to 1. The values for x and y are either both "zero" or are in the range $0 \leq x \leq (S_{Fmax}-S_K)$ or $(0-S_K) \leq y \leq 0$, wherein only x or y can be "zero".

For each color plane, the color density values $F_C$, $F_M$, $F_Y$ and $F_Z$ are determined in step 3. A weighted total color density $S_F$ is calculated in step 4. The differential value $D_S$ is determined from the weighted total color density $S_F$ and the critical total color density value $S_K$ in the following step 5. If x and y both equal "zero" according to step 6, the color density value $F_W$ for white equals "zero" is set for a differential value $D_S$ of greater than or equal to "zero" according to step 7 and the color density value $F_W$ for white equals "one" is set for a differential value $D_S$ of less than "zero". If neither x nor y equals "zero" there is an interval around the critical total color density value $S_K$. If the differential value $D_S$ according to step 10 is greater than or equal to x the color density value $F_W$ for white is set at equals "zero" and if the differential value $D_S$ according to step 12 is less than or equal to y, the color density value $F_W$ for white is set at equals "zero". In all other cases the differential value $D_S$ is in the interval between y and x around the critical total color density value $S_K$ and the color density value $F_W$ for white is described by a linear function $F_W=f(D_S)$.

What is claimed is:

1. A method for optimising print images output onto substrate surfaces by color printers and for optimising the printing ink quantities used, wherein an image motif is processed by means of a computer-aided image processing system to form an image original which is ready for printing, characterised in that at image points of the image original with small or missing total color covering, prior to application of the print image, a base print in white is applied directly to the substrate surface or, in a counter-print, a base print in white is applied directly to the print image, wherein for each image point the method comprises the following steps:

a) displaying an image data of an image original which is ready to output in a raster graphics format with primary printing colors CMYK;
   b) applying a further color plane "white" (W);
   c) acquiring a color density values $F_C$ for C (cyan), $F_M$ for M (magenta), $F_Y$ for Y (yellow) and $F_K$ for K (black) and determining an overall color density $S_F$ from the color density values $F_C$, $F_M$, $F_Y$, and $F_K$.
   d) establishing the color density value $F_W$ for the color plane white as a function $F_W=f(S_F)$ of the total color density $S_F$, wherein the dependency $F_W=f(S_F)$ consists in the fact that with an increasing total color density $S_F$ over the interval of $0 \leq S_F \leq S_{Fmax}$ smaller color density values $F_W$ are continuously and/or discretely allocated, wherein $S_{Fmax}$ corresponds to the maximum possible total color density $S_F$,
   e) creating the image original in a taster graphics data format with at least 5 color planes (CMYKW); and
   f) allocation of the modified image data of the image original to a printer driver or "Raster Image Processor" (RIP) and conversion into a data format which can be interpreted by the printer unit, printing the print image and the white base print.

2. A method according to claim 1, further comprising the following steps:

a) displaying the image data of the image original which is ready to output in a raster graphics format with the primary printing colors CMYK,
   b) applying a further color plane "white" (W),
   c) acquiring the color density values $F_C$ for C (cyan), $F_M$ for M (magenta), $F_Y$ for Y (yellow) and $F_K$ for K (black) allocated to the individual image points, d) allocation of weighting factors a, b, c and d with a value from 0 to 1 and forming weighted color density values: $a^*F_C$, $b^*F_M$, $c^*F_Y$ and $d^*F_K$, e) forming a weighted total color density $S_{Fg}$ from the total of the weighted color density values: $S_{Fg}=(a^*F_C+b^*F_M+c^*F_Y+d^*F_K)$, f) establishing a critical total color density $S_K$ and forming the differential value $D_S=S_{Fg}-S_K$ and establishing the interval limits x, y wherein for x a value in the range $0 \leq x \leq (S_{Fmax}-S_K)$ and a value in the range of $(0-S_K) \leq y \leq 0$ is established for y, and $S_{Fmax}$ corresponds to the maximum possible total color density $S_F$, and:

i) a color density value $F_W$ of 0 is set for the color plane white in the case where $D_S \geq 0$ for established interval limits x, y of x=y=0, ii) a color density value $F_W$ of 1 is set for the color plane white in the case where $D_S<0$ for established interval limits x, y of x=y=0, iii) a color density value $F_W$ of 0 is set for the color plane white in the case where $D_S \geq x$ for an established interval limit x in the range of $0 \leq x \leq (S_{Fmax}-S_K)$, iv) a color density value $F_W$ of 1 is set for the color plane white in the case where $D_S \leq y$ for an established interval limit y in the range of $(0-S_K) \leq y \leq 0$, and v) a color density value $F_W=f(D_S)$ between 0 and 1 is set for the color plane white as a function $f(D_S)$ to be determined in the case where $y<D_S<x$ for established interval limits x, y in the range of $0 \leq x \leq (S_{Fmax}-S_K)$ and $(0-S_K) \leq y \leq 0$, wherein $F_W=f(D_S)$ for decreasing differential values $D_S$ describes a continuous increase in the color density values $F_W$, g) creating the modified image original in a raster graphics format with at least 5 color planes (CMYKW) and h) allocating the modified image data of the image original to a printer driver or "Raster Image Processor" (RIP) and conversion into a data format which can be interpreted by the printer unit, printing the print image and the white base print.

3. A method according to claim 1 or 2, wherein the allocation of the modified image data of the image original takes place on a printer driver or "Raster Image Processors" (RIP) and the image original is converted into a data format which can be interpreted by the printer unit, and a white underprint is applied by the printer unit to the substrate surface with the aid of the color density values $F_W$ for the color plane white allocated to the individual pixels and the print image is then printed on the white underprint.

4. A method according to claim 3, wherein the printing is a counter-print and the allocation of the modified image data of the image original takes place on a printer driver or "Raster Image Processor" (RIP) and the image original is converted into a data format which can be interpreted by the printer unit, and the print image is printed on the substrate surface and a white overprint is applied by the printer unit to the print image with the aid of the color density values $F_W$ allocated to the individual pixels.

5. A method according to claim 3, wherein the image original is in a TIFF raster graphics format or is converted into one.

6. A method according to claim 3, wherein a further color plane is applied with an imaginary special color Z and a color density $F_Z$ of greater than 0 to 1 is allocated to image points with a total color density CMYK=0, in which a white base print is dispensed with or the color density $F_W$ should be smaller than 1, wherein the color density value $F_Z$ represents that part of the color density $F_W$ of the color plane white which should be windowed in the color plane white, so that in fulfilling the condition CMYK=0 and $F_Z>0$ the allocation:

$$F_W=1-F_Z \text{ applies.}$$

7. A method according to claim 6, wherein the color plane Z is allocated, and the color density values $F_Z$ are allocated, during the creation of the image original which is ready to output.

8. A method according to claim 6, wherein the color density $F_Z$ can exclusively adopt the values 0 or 1, and the color density value $F_W$ can be set for $F_Z=0$ at 1 and for $F_Z=1$ at 0.

9. A method according to claim 3, including printing packaging films.

10. A method according to claim 9, including printing with optically colored surfaces.

* * * * *